(12) United States Patent
Jones et al.

(10) Patent No.: US 7,752,835 B2
(45) Date of Patent: Jul. 13, 2010

(54) PULSED COMBUSTION ENGINE

(75) Inventors: James E. Jones, Palm City, FL (US); Gary M. Perkins, Palm Beach Gardens, FL (US); Marsha E. Perkins, legal representative, Palm Beach Gardens, FL (US); Gary D. Roberge, Tolland, CT (US); Douglas A. Thonebe, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 947 days.

(21) Appl. No.: 11/445,977

(22) Filed: Jun. 1, 2006

(65) Prior Publication Data
US 2007/0277500 A1 Dec. 6, 2007

(51) Int. Cl.
F02K 3/02 (2006.01)
F02K 5/02 (2006.01)

(52) U.S. Cl. .................. 60/247; 60/39.76; 60/226.1

(58) Field of Classification Search ............ 60/39.76, 60/226.1, 247
See application file for complete search history.

(56) References Cited

U.S. PATENT DOCUMENTS

| | | | | |
|---|---|---|---|---|
| 2,476,179 A * | 7/1949 | Cameron | ............ | 165/145 |
| 2,575,682 A * | 11/1951 | Price | ............ | 60/262 |
| 2,694,291 A * | 11/1954 | Rosengart | ............ | 60/804 |
| 2,748,564 A * | 6/1956 | Marchal et al. | ............ | 60/248 |
| 3,010,281 A * | 11/1961 | Cervenka et al. | ............ | 60/39.37 |
| 3,045,894 A * | 7/1962 | Ross | ............ | 415/131 |
| 3,269,119 A * | 8/1966 | Price | ............ | 60/804 |
| 3,269,120 A * | 8/1966 | Sabatiuk | ............ | 60/39.43 |
| 3,368,352 A | 2/1968 | Hewson | | |
| 5,832,715 A * | 11/1998 | Dev | ............ | 60/804 |
| 6,047,540 A * | 4/2000 | Dev | ............ | 60/805 |
| 6,442,930 B1 | 9/2002 | Johnson et al. | | |
| 6,865,891 B2 * | 3/2005 | Walsh et al. | ............ | 60/792 |
| 6,886,325 B2 | 5/2005 | Norris et al. | | |
| 6,901,738 B2 | 6/2005 | Sammann et al. | | |
| 6,981,841 B2 | 1/2006 | Krammer et al. | | |
| 7,328,570 B2 * | 2/2008 | Venkataramani et al. | ... | 60/39.38 |
| 7,628,018 B2 * | 12/2009 | Mowill | ............ | 60/726 |
| 2005/0060983 A1 * | 3/2005 | Lardellier | ............ | 60/226.1 |
| 2006/0086078 A1 * | 4/2006 | Paul | ............ | 60/226.1 |

FOREIGN PATENT DOCUMENTS

GB 1020145 A 2/1966

OTHER PUBLICATIONS

JP Office Action for JP2007-086555, dated Nov. 4, 2009.

* cited by examiner

*Primary Examiner*—Michael Cuff
*Assistant Examiner*—Phutthiwat Wongwian
(74) *Attorney, Agent, or Firm*—Bachman & LaPointe, P.C.

(57) ABSTRACT

A turbine engine has a case with an axis. A fan is mounted for rotation about the axis. A turbine is mechanically coupled to the fan to drive rotation of the fan about the axis. A number of compressor/turbine units are downstream of the fan and upstream of the turbine along a core flowpath. A number of compressors are coupled to the compressor/turbine units to receive air and deliver combustion gas to drive the turbine.

23 Claims, 3 Drawing Sheets

PULSED COMBUSTION ENGINE

U.S. GOVERNMENT RIGHTS

The invention was made with U.S. Government support under contract F33615-95-C-2503 awarded by the U.S. Air Force. The U.S. Government has certain rights in the invention.

BACKGROUND OF THE INVENTION

This invention relates to engines, and more particularly to hybrid pulse combustion turbine engines.

In a conventional gas turbine engine, combustion occurs in a continuous, near constant pressure (Brayton cycle), mode. Although present gas turbine engine combustors are relatively efficient, the thermodynamic benefit to cycle efficiency associated with performing the combustion operation at a higher time-averaged pressure has led to many efforts to improve combustion.

It has been proposed to improve thermodynamic efficiency by applying the more efficient combustion of near constant volume combustion pulse detonation engines (PDEs) to turbine engine combustors. In a generalized PDE, fuel and oxidizer (e.g., oxygen-containing gas such as air) are admitted to an elongate combustion chamber at an upstream inlet end, typically through an inlet valve as a mixture. Upon introduction of this charge, the valve is closed and an igniter is utilized to detonate the charge (either directly or through a deflagration to detonation transition). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion.

U.S. Pat. No. 6,442,930, for example, suggests combustor use of PDE technology in addition to use as a thrust augmentor in engines with conventional combustors. Other pulsed combustors are shown in U.S. Pat. Nos. 6,886,325 and 6,901,738.

BRIEF SUMMARY OF THE INVENTION

One aspect of the invention involves a turbine engine having a case with an axis. A fan is mounted for rotation about the axis. A turbine is mechanically coupled to the fan to drive rotation of the fan about the axis. A number of compressor/turbine units are downstream of the fan and upstream of the turbine along a core flowpath. A number of compressors are coupled to the compressor/turbine units to receive air and deliver combustion gas to drive the turbine.

In various implementations, the compressor/turbine units may be centrifugal compressor/radial turbine units, with the turbine coaxially driving the impeller by means of a connecting shaft. There may be a circumferential array of the compressor/turbine units and a circumferential array of the combustors. Each of the compressor/turbine units may be uniquely associated with a single one of the combustors and vice versa. The compressor/turbine units may be coupled to the combustor so that: the compressor of the compressor/turbine unit delivers air to the associated combustor; and the turbine of the compressor/turbine unit receives the combustion gas from the associated combustor. The turbine may be an axial turbine receiving the combustion gas from all of the compressor/turbine units. The axial turbine may be co-spooled with the fan. There may be at least eight of the compressor/turbine units and at least eight of the combustors. The combustors may be non-rotating.

Another aspect of the invention involves a method for operating a turbine engine. Air is directed from a fan to a number of compressor/turbine units. The air is compressed in the compressor/turbine units. The air is directed to a number of combustors. The air is combusted with fuel in the combustors to produce combustion gas. Work is extracted from the combustion gas in the compressor/turbine units to drive the compression. The combustion gas is directed from the compressor/turbine units to a turbine. Work is extracted from the combustion gas in the turbine to drive rotation of the fan.

In various implementations, the combustion gas may be directed from the turbine to join a bypass flow of air from the fan. A mass flow ratio of the flow of the air delivered to the combustors to the bypass flow may be between 1.1 and 1:3. The combusting may be a pulse combusting. The combusting may comprise detonation. The combusting may comprise operating respective ones of the combustors out of phase with each other. The method may be used in aircraft propulsion.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
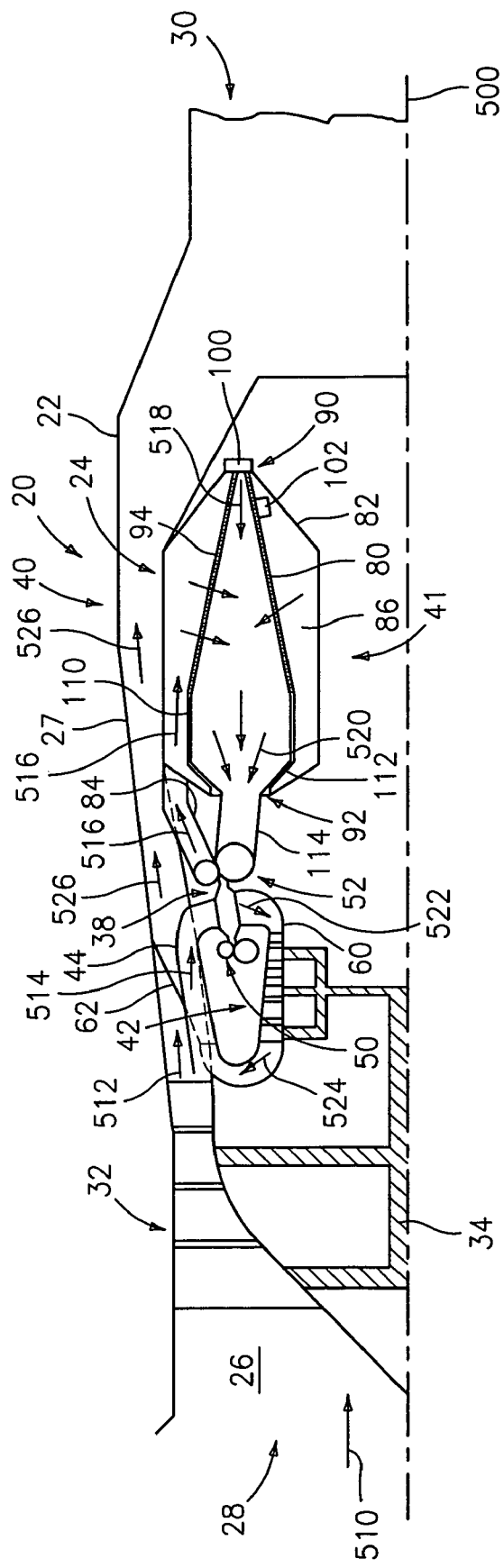
FIG. 1 is a schematic partial longitudinal sectional view of a turbofan engine.

FIG. 1 shows a turbofan engine 20 having central longitudinal axis 500, a case 22, and a core 24. The case 22 defines a duct 26 extending from an upstream inlet 28 to a downstream outlet 30. Of an inlet airflow 510 entering the duct, a fan 32 drives a bypass portion 512 and a core portion 514 along respective bypass and core flowpaths through the duct. The exemplary fan 32 has two blade stages and two interspersed vane stages. The blade stages may be supported on a shaft 34.

Figure 2:
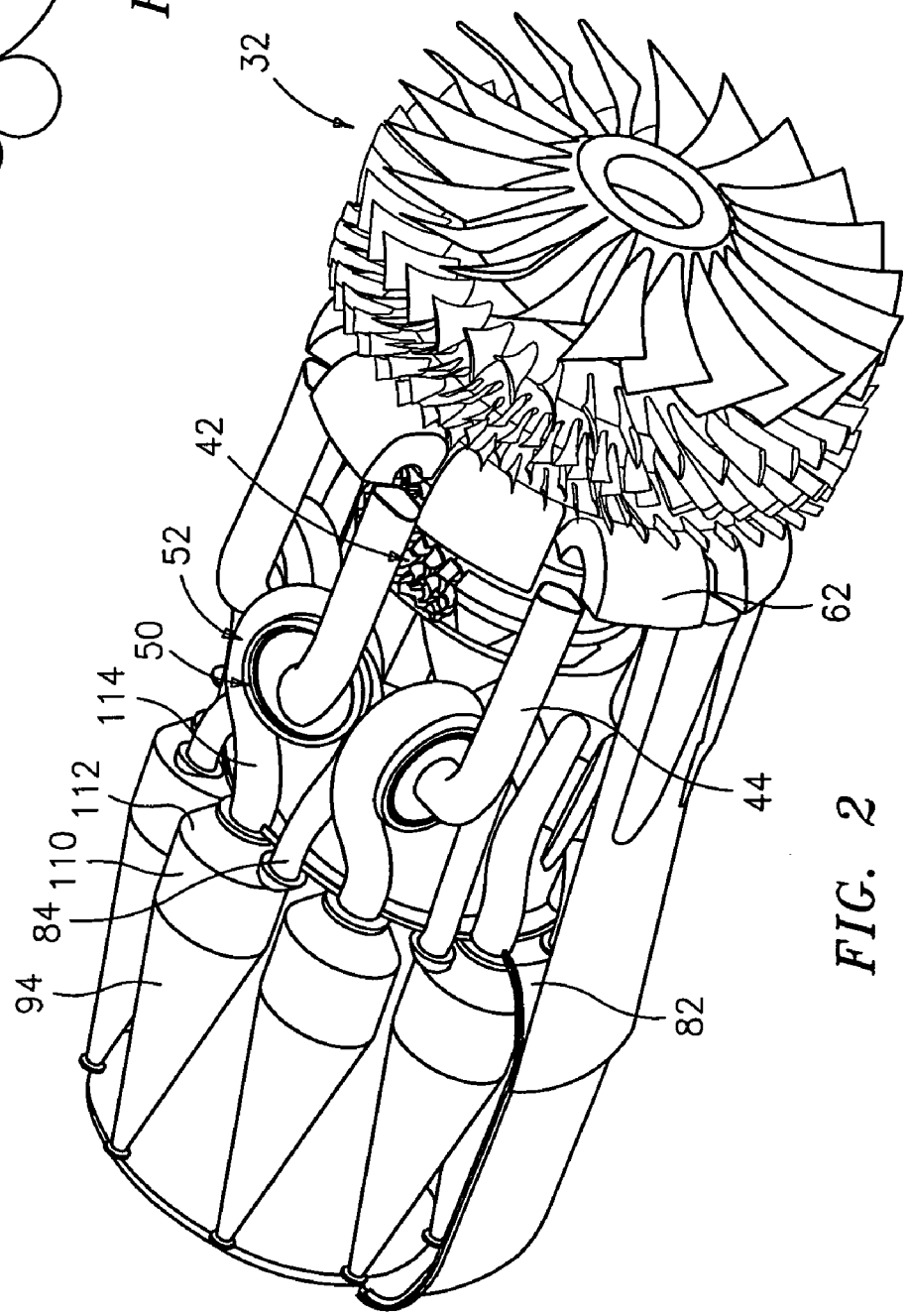
FIG. 2 is a cutaway view of the engine of FIG. 1.

As is described in further detail below, the exemplary engine 20 also includes a circumferential array of compressor/turbine units 38, a combustor section 40 (e.g., circumferential array of combustors 41), and a turbine section 42. Other components (e.g., an augmentor and an exhaust nozzle) may also be present. FIG. 2 shows further details of exemplary positions of the exemplary compressor/turbine units 38 and combustors 41.

The core airflow 514 is divided by ducts 44 into branching portions directed to the compressor sections 50 (e.g., centrifugal compressors) of each of the units 38. Rotation of the impeller of the section 50 is driven by the turbine of the turbine section 52 (e.g., a radial turbine) of the associated unit 38. The units 38 thus compress the flow 514 into compressed flows 516 directed to the combustor section 40. In each unit 38, the compressor section 50 and turbine section 52 are coaxial about an axis non-coincident with the engine axis 500. In the combustor section 40, the compressed air is mixed with a fuel flow 518 and combusted to form combustion gas 520. The gas 520 is directed to the turbine of the turbine section 52 where it is partially expanded to extract the work to compress the flow 514.

From the unit 38, the partially expanded combustion gas flow 522 is directed to the turbine section 42. For example, the turbine sections 52 of the various units 38 may be coupled to a common discharge manifold 60 feeding an upstream/inlet end of the turbine section 42. As the flow 522 passes through the turbine section 42 it is further expanded and discharged as a flow 524. The exemplary flow 524 is directed via a manifold duct 62 to merge with the bypass flow 512 and form a combined flow 526. This combined flow may ultimately be discharged from the outlet 30.

In the exemplary engine of FIG. 1, the blade stages of the turbine section 42 are co-spooled with the fan on the shaft 34. The positioning of the turbine section 42 forward of the combustor section 40, along with the generally forward flow through the turbine section 42 facilitates a short shaft 34 and a longitudinally compact engine. The configuration also hides the moving/hot surfaces of the turbine section 42 from line-of-sight exposure through the outlet. This may be advantageous for low observability properties including radar return and infrared signature.

FIG. 1 shows further details of the exemplary combustor section 40. FIG. 1 shows an inner member 80 within an outer member 82. The airflow 516 is received through an associated conduit 84 to a volume or space 86 between the inner and outer members. There may be a circumferential array of the inner members 80 (one for each combustor 41). In some variations, the outer member 82 may be a single outer member containing all or more than one of the inner members (e.g., an annular outer member). In other variations, there may be a circumferential array of the outer members 82, each containing an associated one of the inner members 80.

The exemplary inner member 80 has an aft end 90 and a fore end 92. The exemplary inner member 80 has a first frustoconical wall portion 94 diverging forward from the aft end 90. The wall portion 94 is foraminate allowing the inflow of air. In the exemplary combustor, a fuel injector 100 may be positioned at the aft end to introduce the fuel flow 518. An igniter 102 (e.g., a sparkplug) may be positioned to ignite the fuel air mixture to cause combustion. The divergence of the wall portion 94 helps facilitate a deflagration-to-detonation transition.

The exemplary inner member 80 has a second wall portion 110 forward of the portion 94. A convergent wall portion 112 is downstream of the portion 110. An outlet conduit 114 connects the inner member 80 to the associated turbine section 52. Individual coupling of the combustors to at least the turbine section 52 prevents crosstalk between the discharge ends of the combustors. This is relevant where the combustors are operated out-of-phase so that the combustion gas discharged by one combustor is not ingested by another.

Inlet decoupling is less critical. Thus, there may be a common outer member 82 defining a common inlet plenum. In yet other embodiments, each combustor may be coupled to receive air from the compressor section 50 of one unit 38 while discharging gases to the turbine section 52 of another unit.

Figure 3:
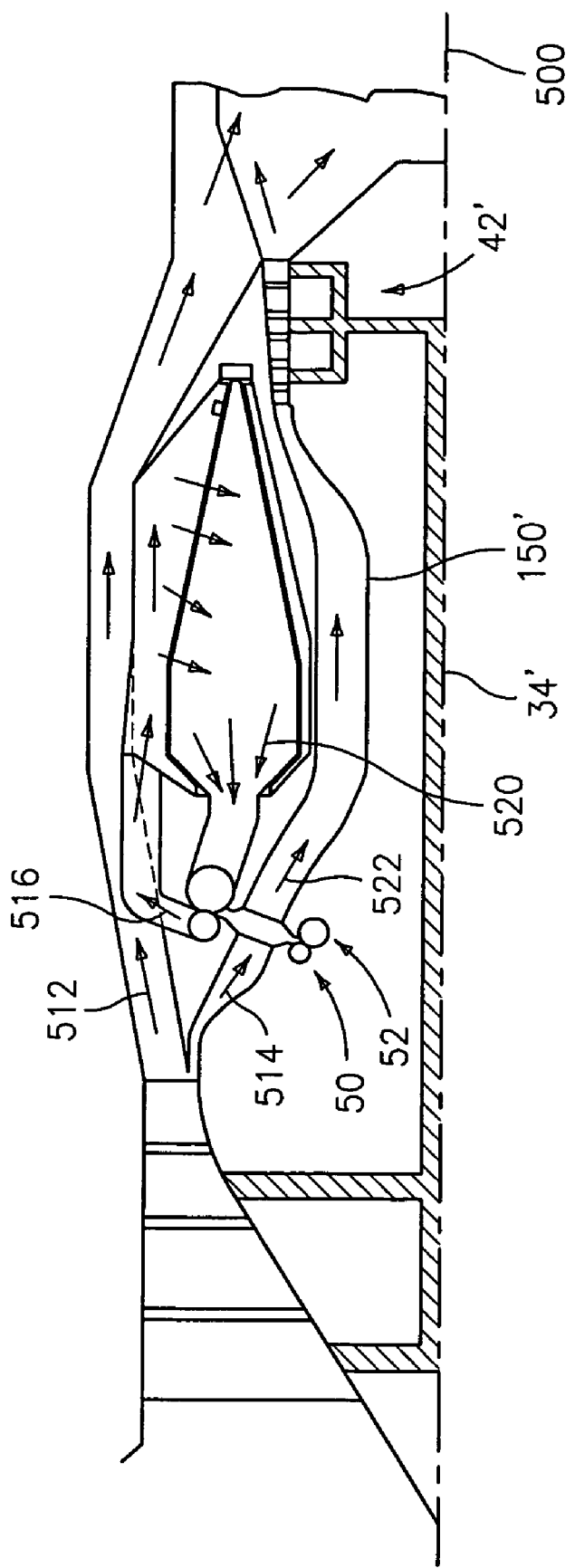
FIG. 3 is a schematic partial longitudinal sectional view of an alternative engine.

FIG. 3 shows an alternative configuration with a long shaft 34' connecting a turbine section 42' to the fan. The exemplary turbine section 42' is aft of the combustor section and receives combustion gases from the compressor/turbine unit array through a manifold 160' directing the combustion gases generally aftward and radially inboard of the combustors. The discharged combustion gases and bypass air mix relatively downstream.

The effects of the pressure pulses from the individual combustors is minimized by operation out-of-phase with each other. Exemplary firing frequency may be in the vicinity of 50-300 Hz and may vary considerably depending on the scale/size of the engine and resulting impact on combustor section geometry and volume. Various phase combinations are possible, including firing in opposed pairs to limit wobble. Exemplary fan spool speeds are 2000-20000 revolutions per minute (RPM), more narrowly 6000-12000 RPM. Exemplary speeds for the units 38 are 5000-50000 RPM, more narrowly 20000-35000 RPM as an approximation for the 6000-12000 RPM fan spool speeds under steady-state conditions.

Figure 4:
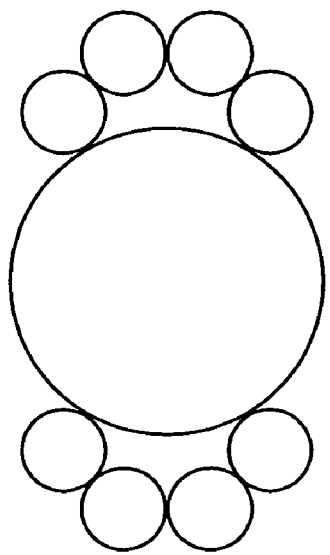
FIG. 4 is a front schematic view of a second alternative engine.

Many variations are possible. For example, the combustors take a variety of forms, including shapes, positions, and orientations. FIG. 4 shows an exemplary configuration wherein eight combustors are grouped in two groups concentrated on respective left and right sides of the engine. This creates a wide but small height package which may be advantageous for integration into the airframe of an aircraft (e.g., a fighter aircraft, unmanned aerial vehicle, or missile).

One or more embodiments of the present invention have been described. Nevertheless, it will be understood that various modifications may be made without departing from the spirit and scope of the invention. For example, the details of any particular application will influence the configuration of the combustor. Various features of the combustor may be fully or partially integrated with features of the turbine or the compressor. If applied in a redesign of an existing turbine engine, details of the existing engine may implement details of the implementation. The combustor may alternatively be used in applications beyond turbine engines. Accordingly, other embodiments are within the scope of the following claims.

What is claimed is:

1. A turbine engine comprising:
   a case having an axis;
   a fan mounted for rotation about the axis;
   a turbine mechanically coupled to the fan to drive rotation of the fan about the axis;
   a plurality of compressor/turbine units downstream of the fan and upstream of the turbine along a core flowpath and each having:
   a centrifugal compressor section; and
   a radial turbine section; and
   a plurality of combustors, coupled to the plurality of compressor/turbine units to receive air and deliver combustion gas to drive the turbine.

2. The engine of claim 1 wherein:
   in each of the compressor/turbine units, the centrifugal compressor section is coaxial with the radial turbine section.

3. The engine of claim 1 wherein:
   in each of the compressor/turbine units, the compressor section has an axial inlet and radial outlet and the turbine section is coaxial therewith and has a radial inlet and axial outlet.

4. The engine of claim 1 wherein
   the plurality of compressor/turbine units is a circumferential array of compressor/turbine units; and
   the plurality of combustors is a circumferential array of combustors.

5. The engine of claim 1 wherein:
each of the plurality of compressor/turbine units is uniquely associated with a single one of the combustors and vice versa and coupled so that:
the compressor of the compressor/turbine unit delivers the air to the associated combustor; and
the turbine of the compressor/turbine unit receives the combustion gas from the associated combustor.

6. The engine of claim 1 wherein:
said turbine is an axial turbine and receiving the combustion gas from all of the compressor/turbine units.

7. The engine of claim 6 wherein:
the axial turbine is co-spooled with the fan.

8. The engine of claim 1 wherein:
there are at least eight of the compressor/turbine units and at least eight of the combustors.

9. The engine of claim 1 wherein:
the combustors are non-rotating.

10. The engine of claim 1 wherein each combustor comprises:
an outer wall;
an inner wall, within the outer wall;
a space between the inner and outer walls coupled to receive air from at least an associated one of the compressor/turbine units;
a fuel injector positioned to introduce fuel to the air; and
a space within the inner wall coupled to deliver combustion gas to at least an associated one of the compressor/turbine units.

11. The engine of claim 1 wherein:
flow of the combustion gas to the plurality of compressor/turbine units is axially toward the fan.

12. A method for operating a turbine engine, the turbine engine comprising:
a case having an axis;
a fan mounted for rotation about the axis;
a turbine mechanically coupled to the fan to drive rotation of the fan about the axis;
a plurality of compressor/turbine units downstream of the fan and upstream of the turbine along a core flowpath and each having:
a centrifugal compressor section; and
a radial turbine section; and
a plurality of combustors, coupled to the plurality of compressor/turbine units to receive air and deliver combustion gas to drive the turbine, the method comprising:
directing air from the fan to the plurality of compressor/turbine units;
centrifugally compressing the air in the compressor/turbine units;
directing the air to the plurality of combustors;
combusting the air with fuel in the combustors to produce combustion gas;
extracting work from the combustion gas in the compressor/turbine units to drive said compressing, the extracting comprising passing the combustion gas radially inward toward an axis of the unit;
directing the combustion gas from the compressor/turbine units to the turbine; and
extracting work from the combustion gas in the turbine to drive rotation of the fan.

13. The method of claim 12 further comprising:
directing the combustion gas from the turbine to join a bypass flow of air from the fan.

14. The method of claim 13 wherein:
a mass flow ratio of the flow of the air delivered to the combustors to the bypass flow is between 1:1 and 1:3.

15. The method of claim 12 wherein:
the combusting is a pulsed combusting.

16. The method of claim 15 wherein:
the combusting comprises detonation.

17. The method of claim 15 wherein:
the pulsed combusting in each of the combustors has a frequency of 50-300 Hz.

18. The method of claim 15 wherein:
the combusting comprises operating respective ones of the combustors out of phase with each other.

19. The method of claim 12 used in aircraft propulsion.

20. The method of claim 12 wherein:
the compressor/turbine units are running at a speed of at least 20000 RPM; and
the fan rotates at a speed of 6000-12000 RPM.

21. The turbine engine of claim 1, wherein:
in each of the plurality of compressor/turbine units, the compressor section is coaxial with the associated turbine section and coupled to the turbine section to be driven by the turbine section.

22. The turbine engine of claim 21 wherein:
the axis of each compressor/turbine unit is not coincident with the engine axis the case axis.

23. The engine of claim 1, wherein:
the turbine is forward of the plurality of combustors.

* * * * *